July 10, 1956  E. WOLPERT  2,754,497
DEVICE FOR KEEPING VEHICLE OPERATORS ALERT
Filed March 4, 1954
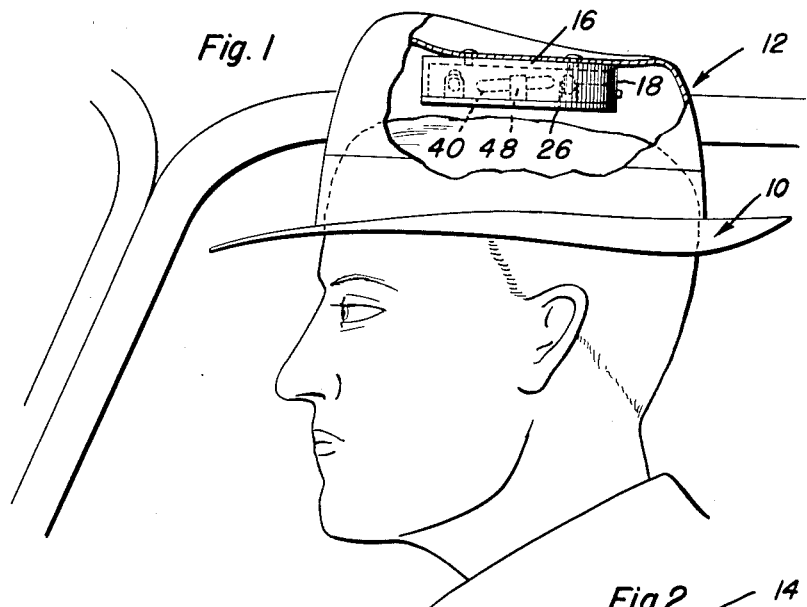
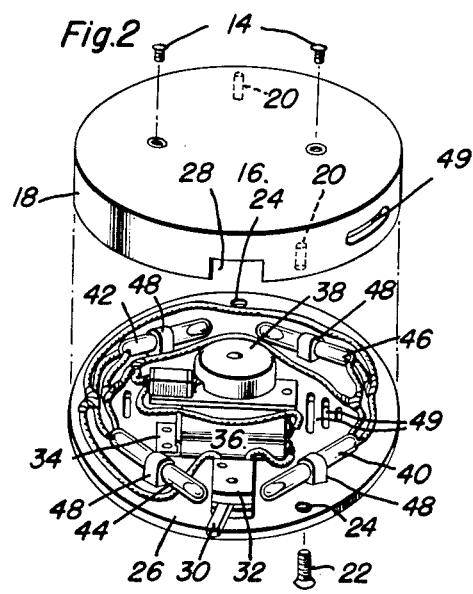
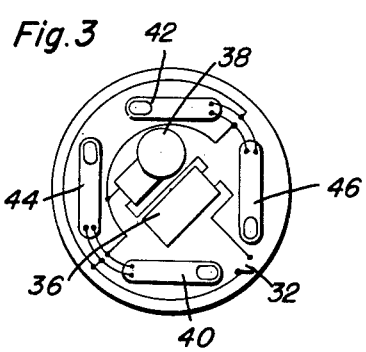
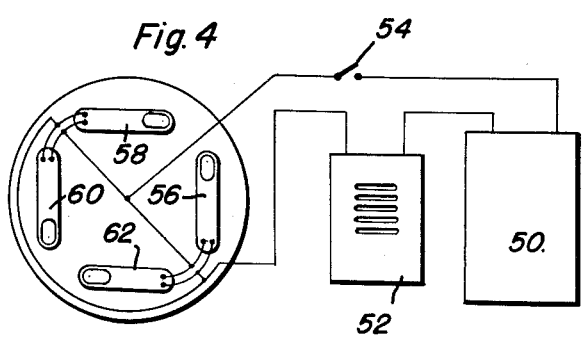
Edward Wolpert
INVENTOR.
BY *Thomas A. O'Brien*
*and Harvey B. Jacobson*
Attorneys United States Patent Office 2,754,497
Patented July 10, 1956

2,754,497
DEVICE FOR KEEPING VEHICLE OPERATORS ALERT

Edward Wolpert, Phillipsburg, N. J.

Application March 4, 1954, Serial No. 414,135

3 Claims. (Cl. 340—279)

This invention relates to a signal device adapted to be used by operators of motor vehicles, aircraft, or the like, and the primary object thereof resides in the provision of means for warning the operator that his head is nodding or tilting, thus assuring that the operator will remain awake and in a proper state of alertness.

Many automotive accidents occur due to the fact that the operators of vehicles will lose control of their vehicles due to falling asleep while driving. The apparatus comprising the present invention comprises a very small and compact device which may be mounted in any conventional headgear in such manner as to be invisible while in use, yet constantly monitoring the position of the head of the operator so that an audible alarm can be provided should the head of the operator be tilted or nodded beyond certain predetermined limits.

The construction of this invention especially features pairs of mercury switches which are tiltably mounted on a base of a casing so that an operative electrical circuit through the mercury switches from a battery to a bell or other audible alarm can be completed. The casing is suspended from suitable means for mounting the device within a conventional hat.

Still further objects and features of this invention reside in the provision of a device for keeping vehicle operators alert, that is strong and durable, simple in construction and manufacture, capable of being made in various sizes for both men and women drivers, and which is highly effective in operation.

These, together with the various ancillary objects and features of the invention which will become apparent as the following description proceeds, are attained by this invention, a preferred embodiment of which has been illustrated in the accompanying drawings, by way of example only, wherein:

Figure 1 is an elevational view showing the device comprising the present invention as operatively installed in a hat, with parts being broken away for greater detail;

Figure 2 is an exploded perspective view of the casing and the electrical components of the invention as mounted on the base;

Figure 3 is a wiring diagram of the component elements of the invention; and

Figure 4 is a wiring diagram of a modified form of the invention employing a separately mounted battery and audible alarm.

With continuing reference to the accompanying drawings wherein like reference numerals designate similar parts throughout the various views, reference numeral 10 generally designates a hat or other conventional headgear adapted to be worn by the operator of a vehicle. Concealed within the hat 10 is the device comprising the present invention, generally indicated by reference numeral 12.

Secured to the hat 10 by means of screws or fasteners 14 is a mounting plate 16. The screws extend through suitable apertures formed in the hat 10 in the crease thereof and are generally substantially invisible to another person. The mounting plate 16 has a downwardly extending peripheral flange or portion 18 having threaded apertures 20 therein for reception of screws 22 or other suitable fasteners which pass through apertures 24 in a base 26 and are adapted to secure the base 26 to the mounting plate 16 to thus form a casing.

The flange 18 is provided with a recess 28 therethrough, through which the actuating member 30 of a switch 32 can extend.

Mounted on the base 26 is a battery holder 34 for mounting a dry cell battery 36, or the like, on the base 26 within the casing. A bell 38 or other similar audible alarm is also mounted on the base 26 within the casing. Connected between the battery 36 and the bell 38 are a plurality of mercury switches which are arranged in pairs as at 40, 42 and 44, 46. The mercury switches 40, 42, 44 and 46 are mounted in bracket supports 48 which have apertures therethrough within which the mercury switches extend, the apertures being canted so that the mercury switches are tilted with respect to the base 26. It is to be noted that each of the switches of each pair of switches are oppositely tilted with respect to each other so as to control the alarm circuit when the vehicle operator's head and hence the casing is tilted in opposite directions.

In operation, with the switch 32 in a closed position, the vehicle operator may move his head to a limited extent depending upon the initial tilting angle of the mercury switches while engaged in the operation of his vehicle. However, should he become sleepy and tend to nod his head, the circuit from the battery through any one of the mercury switches which are arranged in parallel connection with each other and in series with bell 38 will be completed and the bell 38 will be sounded thus alarming and alerting the operator. Openings 49 can be formed in the casing for permitting sound waves to penetrate more easily.

It is within the concept of the invention to employ a battery 50 remote from the headgear of the operator which will operate a buzzer 52 mounted on the dashboard or other suitable place in the vehicle. Hence, upon closure of the switch 54 and actuation of one of the mercury switches 56, 58, 60 or 62, an operating electrical circuit to the battery 52 may be completed. It is to be recognized that in lieu of the buzzer 52 the horn of the vehicle can be utilized.

Since from the foregoing the construction and advantages of applicant's invention are readily apparent, further description is believed to be unnecessary.

However, since numerous modifications will readily occur to those skilled in the art after a consideration of the foregoing specification and accompanying drawing, it is not intended to limit the invention to the precise embodiment shown and described, but all suitable modifications and equivalents may be readily resorted to, which fall within the scope of the appended claims.

What is claimed as new is as follows:

1. A device for keeping vehicle operators alert in combination with a hat comprising a mounting plate positioned within said hat, a base secured to said mounting plate, said base and said mounting plate forming a casing, a battery in said casing, a plurality of mercury switches in said casing, an audible alarm in said casing, said alarm being electrically connected to said mercury switches and said battery, and a manually operated switch extending outside of said casing for controlling flow of electrical power from said battery to said alarm, a plurality of bracket supports on said base, said mercury switches being mounted on said bracket supports tilted with respect to said base.

2. A device for keeping vehicle operators alert in combination with a hat comprising a mounting plate positioned within said hat, means securing said mounting plate to said hat, a base secured to said mounting plate, said base and said mounting plate forming a casing, a battery in said casing, a plurality of mercury switches in said casing, an audible alarm in said casing, said alarm being electrically connected to said mercury switches and said battery, and manually operated switch extending outside of said casing for controlling flow of electrical power from said battery to said alarm, a plurality of bracket supports on said base, said mercury switches being mounted on said bracket supports, said mercury switches being mounted in pairs and tilted with respect to said base with each mercury switch of each pair of mercury switches tilted in the opposite direction from the other mercury switch of each pair of mercury switches, said mercury switches being normally in a circuit open position and being closed upon tilting of the casing to a predetermined degree, said mercury switches being connected in parallel with each other.

3. A device for keeping vehicle operators alert in combination with a hat comprising a mounting plate positioned within said hat, a base secured to said mounting plate, said base and said mounting plate forming a casing, a plurality of mercury switches in said casing, an audible alarm, a battery, said alarm being electrically connected to said mercury switches and said battery, a plurality of bracket supports on said base, said mercury switches being mounted on said bracket supports, said mercury switches being mounted in pairs and tilted with respect to said base with each mercury switch of each pair of mercury switches tilted in the opposite direction from the other mercury switch of each pair of mercury switches.

References Cited in the file of this patent

UNITED STATES PATENTS

| | | |
|---|---|---|
| 2,054,484 | Patterson | Sept. 15, 1936 |
| 2,066,092 | Brown | Dec. 29, 1936 |
| 2,196,543 | Anderson | Apr. 9, 1940 |
| 2,713,159 | Morrison | July 12, 1955 |